United States Patent [19]
Goto et al.

[11] Patent Number: 5,645,359
[45] Date of Patent: Jul. 8, 1997

[54] BIDIRECTIONAL SERIAL PRINTER

[75] Inventors: Koji Goto, Numazu; Akira Oda, Shizuoka-ken, both of Japan

[73] Assignee: Kabushiki Kaisha TEC, Shizuoka-ken, Japan

[21] Appl. No.: 422,983

[22] Filed: Apr. 17, 1995

[30] Foreign Application Priority Data

Apr. 19, 1994 [JP] Japan ................... 6-080020

[51] Int. Cl.$^6$ ........................... B41J 19/30
[52] U.S. Cl. ............ 400/323; 400/279; 400/568
[58] Field of Search ...................... 400/279, 320, 400/323, 568, 555

[56] References Cited

U.S. PATENT DOCUMENTS

| 4,999,646 | 3/1991 | Trask | 346/1.1 |
| 5,044,796 | 9/1991 | Lund | 400/323 |

FOREIGN PATENT DOCUMENTS

| 270343 | 11/1987 | Japan | 400/323 |

Primary Examiner—Edgar S. Burr
Assistant Examiner—Steven S. Kelley
Attorney, Agent, or Firm—Frishauf, Holtz, Goodman, Langer & Chick

[57] ABSTRACT

A serial printer is composed of a paper feeding mechanism for feeding paper, a print head having a plurality of dot printing elements arranged in a feeding direction of the paper, a head moving mechanism for moving the print head in a direction substantially perpendicular to the paper feeding direction to scan the paper, a raster buffer for storing bit map pattern data for a scanning area of the print head, and a control section for causing the print head to print a dot image corresponding to the bit map pattern data stored in the raster buffer while moving the print head in a printing direction and reversing the printing direction after printing the dot image. Particularly, the control section includes a CPU for performing a process of detecting that printing data externally supplied is constructed in a text form containing character codes, determining a coordinate position for each character code, selecting each group of character codes whose printing area is set within the scanning area of the print head, producing bit map pattern data in the raster buffer by converting the character codes of a selected group into a dot data form, and driving the dot printing elements according to the bit map pattern data while moving the print head, and feeding the paper to set the printing area to the scanning area of the print head.

3 Claims, 6 Drawing Sheets

BIDIRECTIONAL SERIAL PRINTER

BACKGROUND OF THE INVENTION

1. Field of the Invention

This invention relates to a serial printer for performing a bi-directional printing.

2. Description of the Related Art

In a general serial printer, the print head has a plurality of dot printing elements arranged in the paper feed direction at a preset pitch, and reciprocates in a direction perpendicular to the paper feed direction to scan paper. The printer produces bit map pattern data having dot rows whose number corresponds to the number of the dot printing elements, prints a dot image of characters or figures by driving the dot printing elements according to the bit map pattern data in the forward path of the print head, and feeds the paper by a distance corresponding to a printing height of the print head. In recent years, most serial printers are constructed to also print in the return path of the print head.

In a case where the height of characters or figures exceeds the printing height of the print head, the printer prints a dot image representing the upper half of characters, for example in the forward path of the print head, and a dot image representing the lower half thereof in the return path of the print head. However, the printing quality of the characters is deteriorated when a dot alignment error is caused by a difference in the printing direction.

A printer which can reduce the deterioration in the printing quality is disclosed in U.S. Pat. No. 5,044,796. With the above printer, it is checked whether the bit map pattern data contains a break line which separates characters or figures adjacent in the paper feed direction. If the break line is found within a range of dot lines corresponding to the number of dot printing elements of the print head, the height of the characters or figures is determined to be not larger than the printing height of the printing head. At this time, the print head scans paper one time to print the characters or figures in the form of a dot image whose height is limited based on the position of the break line. On the other hand, if the break line is not found within a range of dot lines corresponding to the number of dot printing elements of the print head, the height of the characters or figures is determined to be larger than the printing height of the printing head. At this time, the print head scans paper plural times to print the characters or figures in the form of a dot image whose height is equal to the printing height of the print head. The printing direction is reversed only when the break line is found. That is, the printer fixedly sets the printing direction in one direction so as to prevent the printing quality from being deteriorated.

A printer which can reduce the deterioration in the printing quality caused by a dot alignment error due to the precision of the paper feeding mechanism is disclosed in U.S. Pat. No. 4,999,646. With the above printer, bit map pattern data of one page is converted into first and second complementary pattern data items of the same matrix size as the bit map pattern data. The printer sets the distance of paper feed to be equal to half the printing height of the print head, and prints dot images in the forward path and return path of the print head. In the forward path of the print head, dot printing elements thereof are driven based on a portion of the first pattern data which corresponds to the scanning area of the print head. In the return path of the print head, the dot printing elements are driven based on a portion of the second pattern data which corresponds to the scanning area of the print head. That is, with the above printer, the scanning areas of the forward path and return path are overlapped by half the printing height of the printing head and dot images printed in the forward path and return path are combined to as to prevent the printing quality from being deteriorated.

However, in the printer disclosed in U.S. Pat. No. 5,044,796, the throughput thereof cannot be improved at all when the printing direction is fixed in one direction. Further, it is necessary to check whether or not the break line is contained in the bit map pattern data in order to determine the printing direction and the height of the dot image. The checking process requires a relatively long time and limits the enhancement of the throughput.

In the printer disclosed in U.S. Pat, No. 4,999,646, since the dot image printed in the forward path of the print head and the dot image printed in the return path are combined, the entire portion of the dot image of characters or figures which do not exceed the printing height of the print head cannot be printed only in one of the forward path and return path of the print head.

SUMMARY OF THE INVENTION

An object of this invention is to provide a serial printer capable of enhancing the throughput without deteriorating the printing quality.

According to a first aspect of this invention, there is provided a serial printer which comprises a paper feeding mechanism for feeding paper; a print head having a plurality of dot printing elements arranged in a feeding direction of the paper; a head moving mechanism for moving the print head in a direction substantially perpendicular to the paper feeding direction to scan the paper; a raster buffer for storing bit map pattern data for a scanning area of the print head; and a control section for causing the print head to print a dot image corresponding to the bit map pattern data stored in the raster buffer while moving the print head in a printing direction and reversing the printing direction after printing the dot image; wherein the control section includes a text processing circuit for performing a process of detecting that printing data externally supplied is constructed in a text form containing character codes, determining a coordinate position for each character code, selecting each group of character codes whose printing area is set within the scanning area of the print head, producing bit map pattern data in the raster buffer by converting the character codes of a selected group into a dot data form, and driving the dot printing elements according to the bit map pattern data while moving the print head, and feeding the paper to set the printing area to the scanning area of the print head.

According to a second aspect of this invention, the control section further includes upper and lower work buffers each for storing lines of dot data the number of which equals to half the number of dot printing elements, and a graphic processing circuit for performing a process of detecting that the printing data externally supplied is constructed in a graphic form containing lines of dot data, determining a coordinate position for each dot data line, selecting each group of sequential dot data lines the number of which equals to half the number of dot printing elements of the print head, storing the sequential dot data lines of a selected group in the lower work buffer, producing bit map pattern data in the raster buffer by selectively masking, with a mask pattern, a combination of dot data items retrieved from the upper and lower work buffers, driving the dot printing elements according to the bit map pattern data while moving the print head, feeding the paper by a distance equal to half the printing height of the print head determined by the number of dot printing elements and the pitch thereof, saving the lines of dot data stored in the lower work buffer into the upper work buffer, and reversing the mask pattern.

The serial printer according to the first aspect detects that printing data externally supplied is constructed in a text form containing character codes, determines a coordinate position for each character code, selects each group of character codes whose printing area is set within the scanning area of the print head, produces bit map pattern data in the raster buffer by converting the character codes of a selected group into a dot data form. That is, since the character code group necessary for printing can be easily selected on the basis of the coordinate position thereof, the throughput can be further enhanced than in a case where the bit map pattern data is checked. Further, since the entire portion of the dot image of characters can be printed only in one of the forward path and return path of the print head, the printing quality will not be deteriorated.

The serial printer according to the second aspect detects that the printing data externally supplied is constructed in a graphic form containing lines of dot data, determines a coordinate position of each dot data line, selects each group of sequential dot data lines the number of which equals to half the number of dot printing elements of the print head, stores the sequential dot data lines of a selected group in the lower work buffer, produces bit map pattern data in the raster buffer by selectively masking, with a mask pattern, a combination of dot data items retrieved from the upper and lower work buffers. In this case, memory for storing bit map pattern data of one page is not required. Further, since the dot image of figures is constructed by a combination of a dot image printed in the forward path of the print head and a dot image printed in the return path of the print head, the printing quality will not be deteriorated. Moreover, the throughput can be further enhanced than in a case where the printing direction is fixed in one direction.

Additional objects and advantages of the invention will be set forth in the description which follows, and in part will be obvious from the description, or may be learned by practice of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

A serial printer according to one embodiment of the present invention will be described with reference to accompanying drawings.

Figure 1:
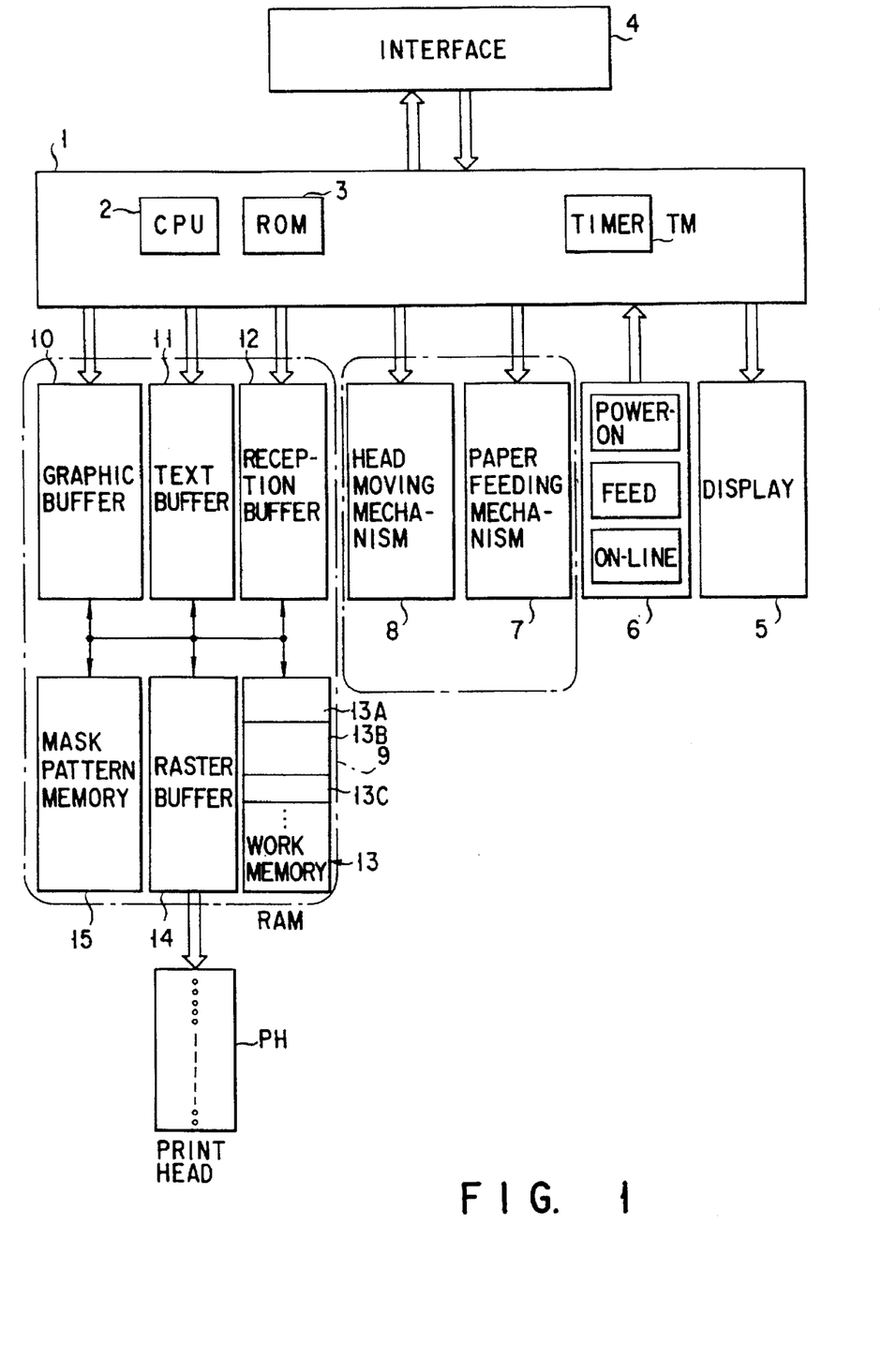
FIG. 1 is a circuit diagram showing a serial printer according to one embodiment of this invention.

FIG. 1 shows a circuit of the serial printer. The serial printer has a control section 1 for controlling the entire operation thereof. The control section 1 includes a CPU 2 for performing various data processings, a ROM 3 for storing a control program for the CPU 2, bit map fonts for various characters, and the like of fixed data, and a timer TM. The control section 1 is connected to an interface for receiving printing commands such as printing data, paper size data, print format data, and the like supplied from an external device such as a host computer, a display 5 for displaying an operation status of the printer, and a keyboard 6 for entering control instructions. The keyboard 6 has a power-on key, feed key, and on-line key. The printing data is constructed in a text form containing character codes or in a graphic form containing lines of dot data. The character code represents a character, a numeral, a symbol, and the like, and the dot data represents presence or absence of a dot.

The control section 1 further connected to a paper feeding mechanism 7 for feeding paper, a head moving mechanism 8 for moving a print head PH in a direction substantially perpendicular to the paper feed direction to scan the paper, and a RAM 9 for temporarily storing data processed by the CPU 2. The print head PH has N dot printing elements, and these printing elements are aligned in the paper feed direction at a preset pitch. In a case where the print head is of an ink-jet type, each dot printing element is formed of a nozzle for ejecting ink. The print head PH scans the paper within a printing width set to L dots, for example. The RAM 9 includes a graphic buffer 10, a text buffer 11, a reception buffer 12, a work memory 13, a raster buffer 14, and a mask pattern memory 15. The reception buffer 12 sequentially stores printing commands received by the interface 4. The graphic buffer 10 stores each line of dot data contained in printing data of the graphic form along with its attribute data. The text buffer 11 stores each character code contained in printing data of the text form along with its attribute data. The raster buffer 14 stores bit map pattern data of N dot rows×L dot columns which is used for driving the dot printing elements when the print head PH moves to scan the paper. The work memory 13 is used for producing the bit map pattern data, and has an upper work buffer 13A for storing N/2×L dot data items assigned to the upper half of the bit map pattern data, a lower work buffer 13B for storing N/2×L dot data items assigned to the lower half of the bit map pattern data, a coordinate pointer 13C for pointing the top coordinate YP of the scanning area of the print head PH shifted in the paper feed direction, and other work areas. The mask pattern memory 15 stores a mask pattern data of a checker arrangement used for masking a matrix of dot data to be stored in the raster buffer 14 as the bit map pattern data.

In a case where the resolution of printing is set to 300 dots per inch, the number N of dot printing elements of the print head PH is set to 128, and the number L of dots corresponding to the printing width is set to 2,400, the raster buffer 14 has a matrix size of 128 dot rows×2,400 dot columns, the graphic buffer 10 has a matrix size of 50 dot rows×2,400 dot columns, and the text buffer 11 has a size for storing 8,000 one-byte character codes.

An operation of the serial printer will be described below.

Figure 2:
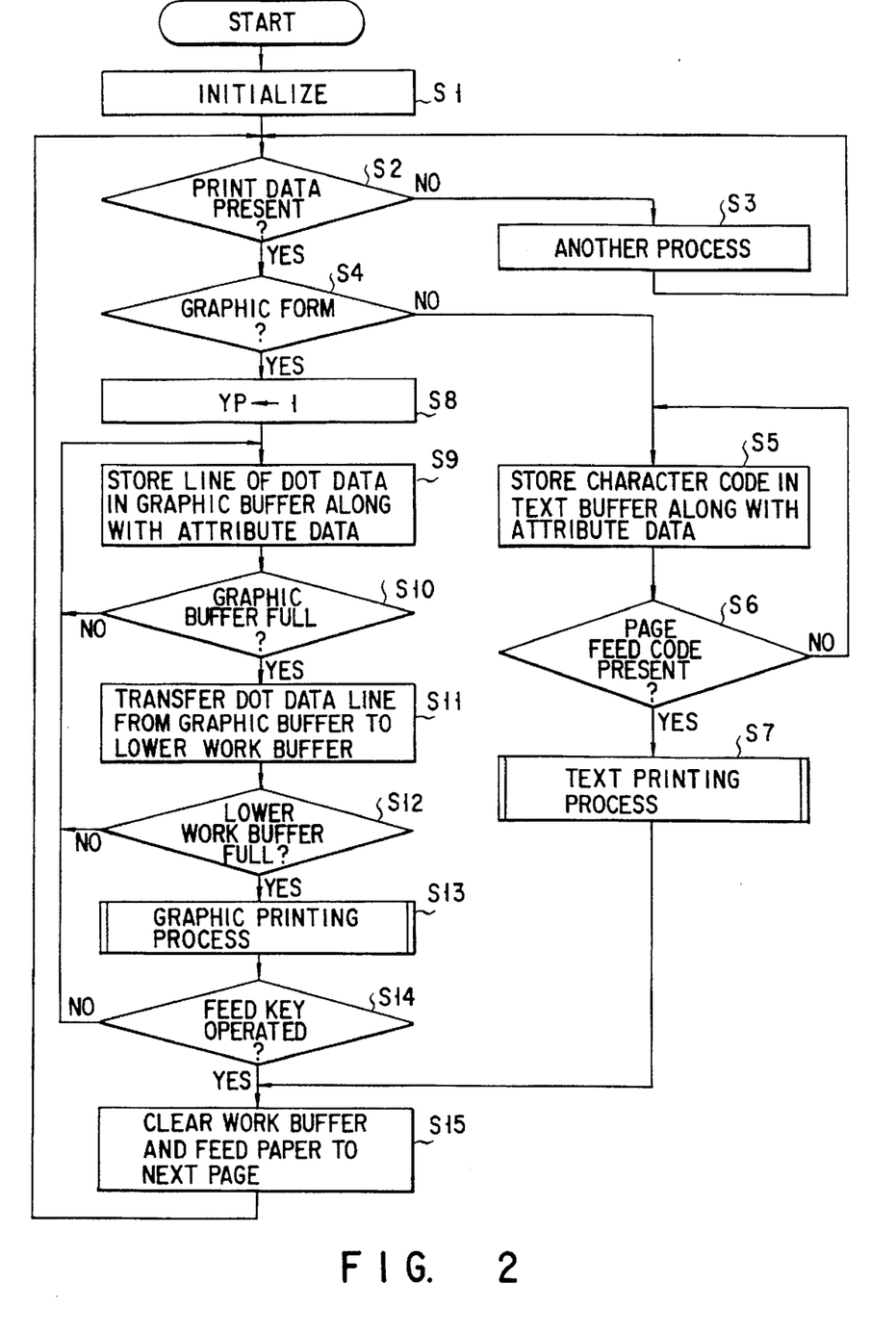
FIG. 2 is a flowchart for schematically illustrating the operation of the serial printer shown in FIG. 1.

When power is supplied to the printer, the CPU 2 performs a print control process of FIG. 2 by executing the control program stored in the ROM 3. An initialization is performed in step S1. In this initialization, the graphic buffer 10, text buffer 11, reception buffer 12, work memory 13, and raster buffer 14 are cleared, and the mask pattern data is stored in the mask pattern memory 15. In step S2, it is checked whether printing data supplied from the external device is present in the reception buffer 12. If no printing data is present, another process is performed in step S3 to set a paper size and other items, and step S2 is executed again. If the printing data is present, it is checked in step S4 whether the printing data is constructed in the graphic form containing lines of dot data arranged in series. If the printing data is not constructed in the graphic form, it is determined to be constructed in the text form containing character codes arranged in series. At this time, in step S5, the CPU 2 determines a character size (height and width) and a printing position for the initial character code retrieved from the reception buffer 12 as an attribute thereof, and stores the character code in the text buffer 11 along with attribute data representing the attribute. The printing position is represented by 2-dimensional coordinates set within a page corresponding to the size of paper to be used. In step S6, it is checked whether a page feed code is present in the text buffer 11. If no page feed code is present, steps S5 and S6 are repeated to store subsequent character codes in the text buffer 11. If presence of the page feed code is detected, a text printing process is performed in step S7.

When the printing data is detected to be constructed in the graphic form, the top coordinate YP of the scanning area is set to "1" in step S8. In step S9, the CPU 2 determines a printing position for the initial line of dot data retrieved from the reception buffer 12 as an attribute thereof, and stores the line of dot data in the graphic buffer 10 along with attribute data representing the attribute. In step S10, it is checked whether the graphic buffer 10 is full. If the buffer 10 is not full, steps S9 and S10 are repeated to store subsequent lines of dot data in the graphic buffer 10. After the buffer 10 becomes full, the initial line of dot data is, in step S11, transferred from the graphic buffer 10 to the lower work buffer 13B, and deleted from the graphic buffer 10 along with its attribute data. In step S12, it is checked whether the lower work buffer 13B is full. If the buffer 13B is not full, steps S9 to S11 are repeated to store subsequent lines of dot data in the lower work buffer 13B. After the lower work buffer 13B becomes full, a graphic printing process is performed in step S13, and it is checked in step S14 whether the feed key has been operated to terminate a printing for one page. If the feed key has not been operated, steps S9 to S14 are repeated to continue the printing.

After operation of the feed key is detected in step S14 or the text printing process performed is completed in step S7, step S15 is executed to clear the work memory 13 and feed the paper to the next page. Thereafter, step S2 is executed again.

Figure 3:
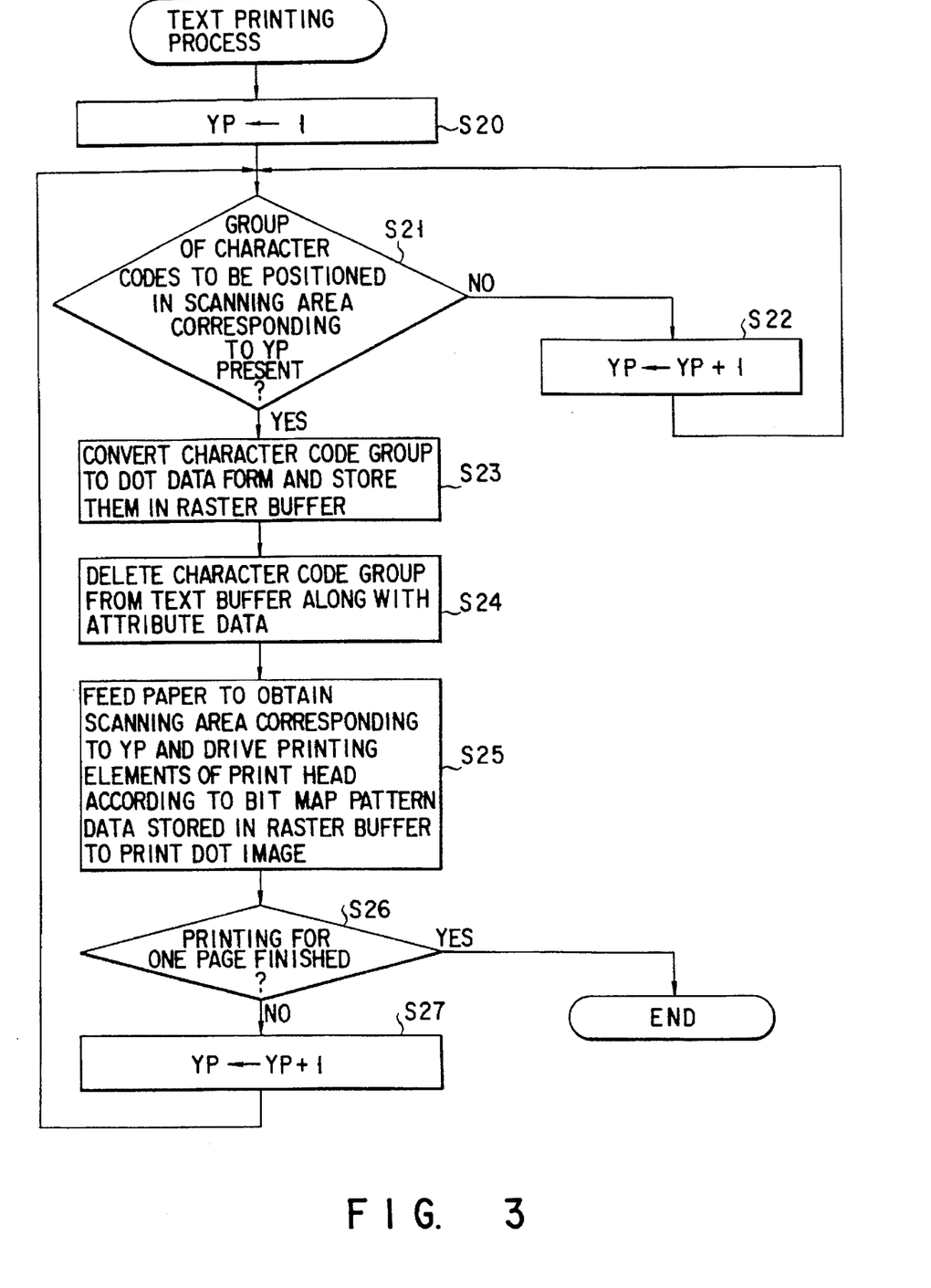
FIG. 3 is a flowchart for more specifically illustrating the text printing process shown in FIG. 2.

The above text printing process is performed as shown in FIG. 3. When the text printing process begins, the top coordinate YP of the coordinate pointer 13C is set to "1" in step S20. In step S21, it is checked whether there is a group of character codes whose printing area is set within the scanning area (N dots×L dots) of the print head PH which corresponds to the top coordinate YP. If no group of character codes is found, the top coordinate YP is incremented by "1" in step S22, and step S21 is executed again. Steps S21 and S22 are repeated to shift the top coordinate YP. After the group of character codes is found, step S23 is executed to convert character codes of the group in a dot data form by using corresponding bit map fonts and store them in the raster buffer 14 as a bit map pattern data. In step S24, the character codes of the group are deleted from the text buffer 11 along with their attribute data. In step S25, the CPU 2 performs a control of feeding the paper to obtain the scanning area of the print head PH corresponding to the top coordinate YP, driving the dot printing elements according to the bit map pattern data stored in the raster buffer 14 while moving the print head in a printing direction, and then reversing the printing direction. In step S26, it is checked whether a printing for one page is finished. If it is finished, the text printing process is ended. If it is not finished, the top coordinate YP of the scanning area is incremented by "1" in step S27 and the step S21 is executed again.

Figure 5:
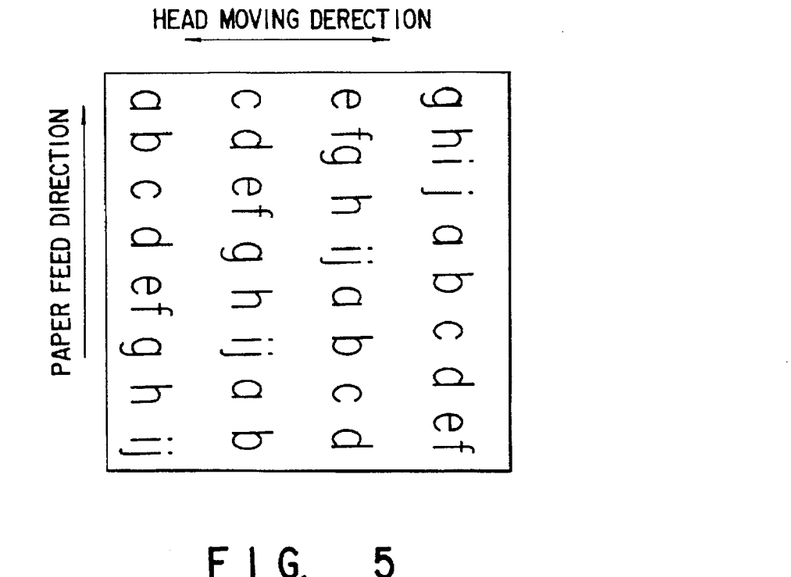
FIG. 5 is a diagram showing the arrangement of characters supposed based on attribute data stored in a text buffer shown in FIG. 1.
Figure 6:
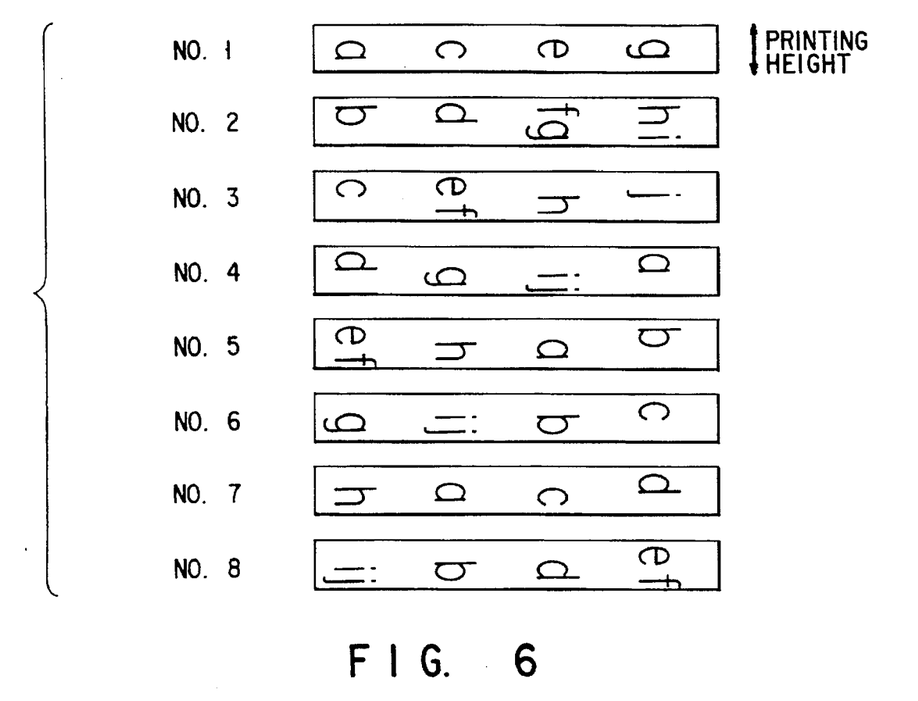
FIG. 6 is a diagram for illustrating bit map pattern data sequentially produced in a raster buffer of FIG. 1 in the text printing process.

For example, when the text buffer 11 stores character codes representing characters arranged as shown in FIG. 5, the printer repeatedly detects a group of character codes whose printing area is set within the scanning area of the print head PH by shifting the top coordinate YP in the paper feed direction, produces bit map pattern data in an order shown in FIG. 6, and prints a dot image of characters according to each bit map pattern data.

Figure 4:
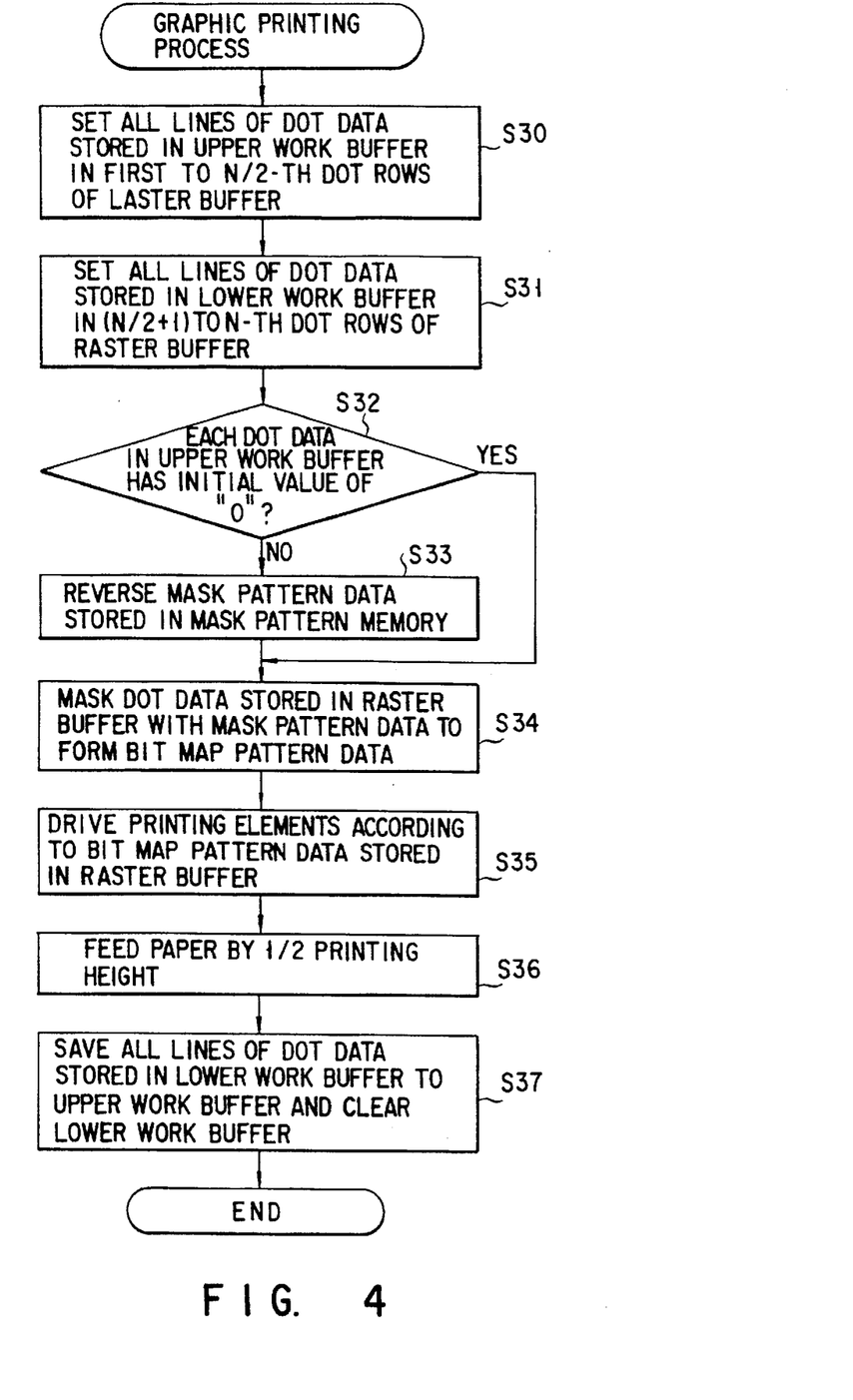
FIG. 4 is a flowchart for more specifically illustrating the graphic printing process shown in FIG. 2.

The above graphic printing process is performed as shown in FIG. 4. When the graphic printing process begins, all the lines of dot data stored in the upper work buffer 13A are set in the first to N/2-th dot rows of the raster buffer 14 in step S30, and all the lines of dot data stored in the lower work buffer 13B are set in the (N/2+1) to N-th rows of the raster buffer 14 in step S31. In step S32, it is checked whether each dot data stored in the upper work buffer 13A has an initial value "0". If YES, step S34 is directly executed to maintain a mask pattern data stored in the mask pattern memory 15. This mask pattern data is initially formed of data "010101..." set in each odd row of the memory 15 and data "101010..." set in each even row of the memory 15. If NO, step S34 is executed after step S33 is executed to reverse the mask pattern data. The data "010101..." is reversed to "101010...", and the data "101010..." is reversed to "010101...". In step S34, dot data items stored in the raster buffer 14 are selectively masked using the mask pattern data stored in the to form bit map pattern representing a dot image to be printed. That is, the dot data is canceled to represent a blank, if "0" contained in the mask pattern data is assigned thereto. In step S35, the CPU 2 performs a control of driving the dot printing elements according to the bit map pattern stored in the raster buffer 14 while moving the print head PH in a printing direction. In addition, the paper is fed to the next page before driving the dot printing elements, if YP+N/2 exceeds a maximum coordinate for one page. In step S36, the paper is fed by half the printing height of the print head PH determined by the number N of the dot printing elements and the pitch thereof, and the printing direction is reversed. In step S37, all the lines of dot data stored in the lower work buffer 13B are saved in the corresponding dot rows of the upper work buffer 13A, and the lower work buffer 13B is cleared. Thereafter, the graphic printing process is ended.

Figure 7:
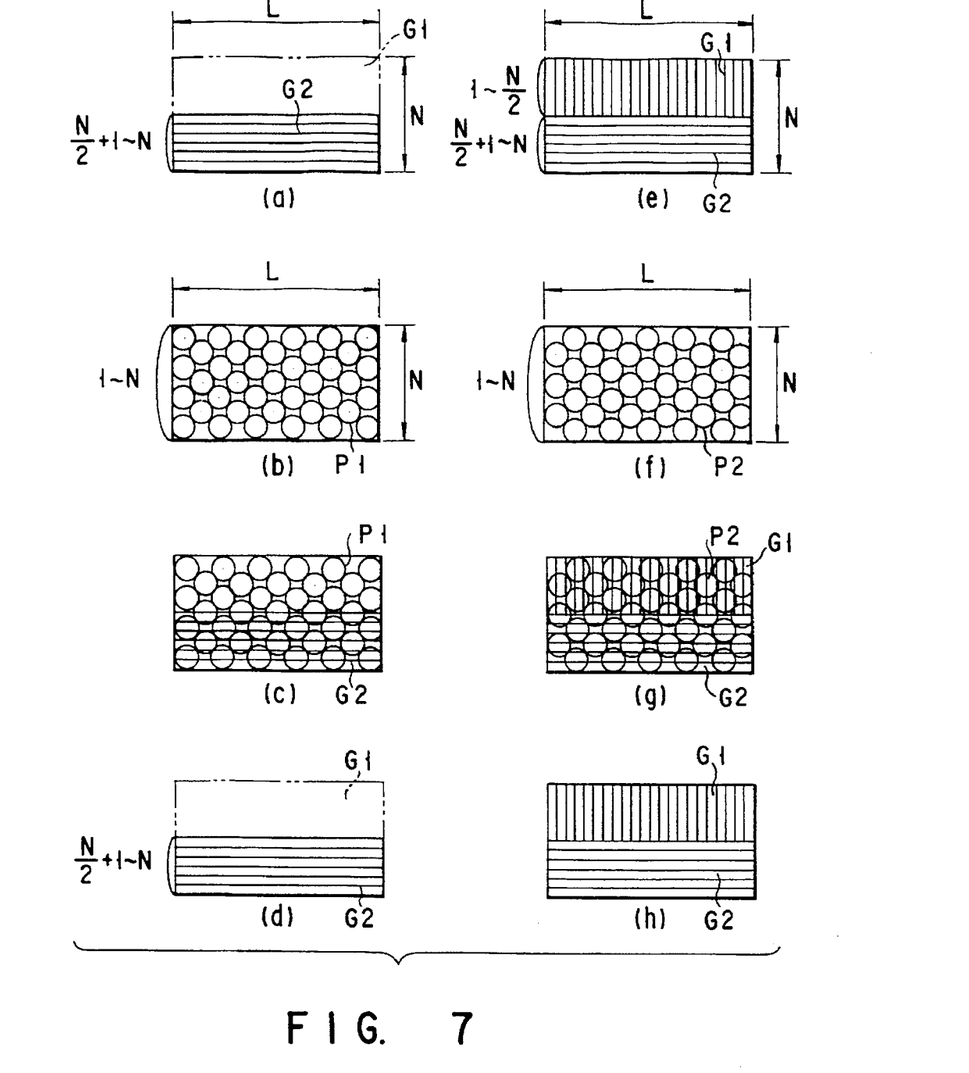
FIG. 7 is a diagram for illustrating bit map pattern data sequentially produced in the raster buffer of FIG. 1 in the graphic printing process.

In the graphic printing process, dot data G2 retrieved from the lower work buffer 13B are stored in the (N/2+1) to N-th dot rows of the raster buffer 14 as shown in (a) of FIG. 7. In the first to N/2-th dot rows of the raster buffer 14, dot data G1 retrieved from the upper work buffer 13A and representing blanks are stored. Mask pattern data P1 stored in the mask pattern memory 15 is shown in (b) of FIG. 7. Each circle portion in (b) of FIG. 7 represents data "0" for masking dot data. The mask pattern data P1 is set as shown in (c) of FIG. 7 and selectively masks N×L items of dot data to form bit map pattern data shown in (d) of FIG. 7. A dot image is printed using the bit map pattern data. After printing the dot image, the paper is fed by half the printing height of the print head PH, and the dot data G2 are saved in the upper work buffer 13A.

Figure 8:
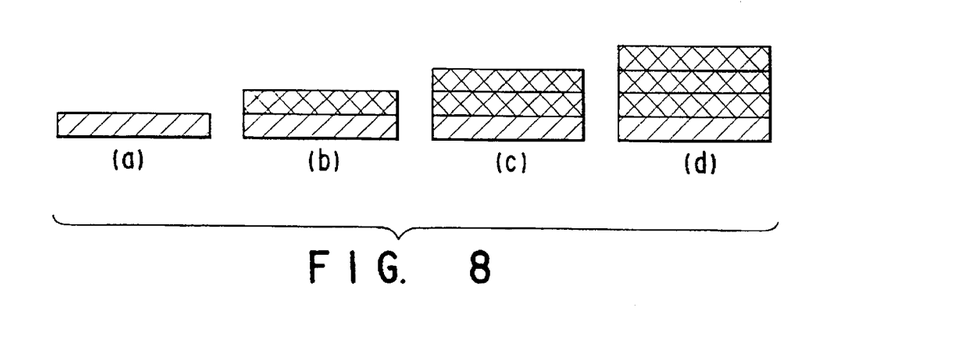
FIG. 8 is a diagram showing dot images sequentially printed in the graphic printing process.

When the printing direction is reversed, dot data G1 and G2 retrieved from the upper and lower work buffers 13A and 13B are respectively stored in the first to N/2-th dot rows of the raster buffer 14 and in the (N/2+1) to N-th dot rows of the raster buffer 14, as shown in (e) of FIG. 7. Mask pattern data P2 shown in (f) of FIG. 7 is obtained by reversing the mask pattern data P1 stored in the mask pattern memory 15. Each circle portion in (f) of FIG. 7 also represents data "0" for masking dot data. The mask pattern data P2 is set as shown in (g) of FIG. 7 and selectively masks N×L items of dot data to produce bit map pattern data shown in (h) of FIG. 7. Another dot image is printed using the bit map pattern data. After printing this dot image, the paper is fed by half the printing height of the print head PH, and the dot data G2 are saved in the upper work buffer 13A. By repeating the above operation, dot images are printed as shown in (a), (b), (c), (d) of FIG. 8. The entire image of figures is obtained as a combination of these dot images.

According to the embodiment described above, the serial printer detects that printing data externally supplied is constructed in a text form containing character codes, determines a coordinate position for each character code, selects each group of character codes whose printing area is set within the scanning area of the print head PH, produces bit map pattern data in the raster buffer 14 by converting the character codes of a selected group into a dot data form. That is, since the character code group necessary for printing can be easily selected on the basis of the coordinate position thereof, the throughput can be further enhanced than in a case where the bit map pattern data is checked. Further, since the entire portion of the dot image of characters can be printed only in one of the forward path and return path of the print head PH, the printing quality will not be deteriorated.

The serial printer further detects that the printing data externally supplied is constructed in a graphic form containing lines of dot data, determines a coordinate position of each dot data line, selects each group of sequential dot data lines the number of which equals to half the number of dot printing elements of the print head PH, stores the sequential dot data lines of a selected group in the lower work buffer 13B, produces bit map pattern data in the raster buffer 14 by selectively masking, with a mask pattern, a combination of dot data items retrieved from the upper and lower work buffers 13A and 13B. In this case, memory for storing bit map pattern data of one page is not required. Further, since the dot image of figures is constructed by a combination of a dot image printed in the forward path of the print head PH and a dot image printed in the return path of the print head PH, the printing quality will not be deteriorated. Moreover, the throughput can be further enhanced than in a case where the printing direction is fixed in one direction.

The above embodiment can be modified. For example, the alignment and orientation of characters shown in FIG. 5 may be changed based on the length and width of paper.

Further, the serial printer of the embodiment reverses the mask pattern data stored in the mask pattern memory 15 when the printing direction is reversed. However, two types of complementary mask pattern data may be stored in the mask pattern memory 15, so that one type of the mask pattern data can be changed to the other type when the printing direction is reversed.

If it is necessary to print images of characters on the left side of paper and images of figures on the light side of the paper, the printer may be modified to convert character codes stored in the text buffer 11 into the dot data form and transfers them from the text buffer 11 to the graphic buffer 10. In this case, the printer needs not perform a printing independently for each of printing data of the text form and printing data of the graphic form.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A serial printer comprising:

a paper feeding mechanism for feeding paper in a paper feeding direction;

a print head having a plurality of dot printing elements arranged in the paper feeding direction;

a head moving mechanism for moving said print head in a direction substantially perpendicular to the paper feeding direction to scan the paper;

a raster buffer for storing bit map pattern data for a scanning area of said print head; and a control section for causing said print head to print a dot image corresponding to the bit map pattern data stored in said raster buffer while moving said print head in a printing direction and reversing the printing direction after printing the dot image;

wherein said control section includes text processing means for detecting that printing data externally supplied is constructed in a text form containing character codes, determining a coordinate position for each character code, selecting each group of character codes whose printing area is set within the scanning area of said print head, producing bit map pattern data in said raster buffer by converting the character codes of a selected group of character codes into a dot data form, the produced bit map pattern data representing a whole image of the characters of the selected group of character codes, driving said dot printing elements according to the bit map pattern data while moving said print head, and feeding the paper to set the printing area to the scanning area of said print head, wherein said control section further includes:

upper and lower work buffers each for storing lines of dot data the number of which is equal to half the number of dot printing elements; and graphic processing means for detecting that the printing data externally supplied is constructed in a graphic form containing lines of dot data, determining a coordinate position for each dot data line, selecting each group of sequential dot data lines the number of which is equal to half the number of dot printing elements of said print head, storing the sequential dot data lines of a selected group in said lower work buffer, producing bit map pattern data in said raster buffer by selectively masking, with a mask pattern, a combination of dot data items retrieved from said upper and lower work buffers, driving said dot printing elements according to the bit map pattern data while moving said print head, feeding the paper by a distance equal to half the printing height of said print head determined by the number of dot printing elements and the pitch thereof, saving the lines of dot data stored in said lower work buffer into said upper work buffer, and reversing the mask pattern.

2. A serial printer according to claim 1, wherein said control section further includes a graphic buffer for storing each dot data line contained in the printing data of the graphic form along with attribute data representing a coordinate position thereof.

3. A serial printer according to claim 1, wherein said control section further includes a mask pattern memory for storing the mask pattern.

* * * * *